US008611450B2

(12) United States Patent
Gan et al.

(10) Patent No.: US 8,611,450 B2
(45) Date of Patent: *Dec. 17, 2013

(54) MULTIPLE-INPUT MULTIPLE-OUTPUT SIGNAL DETECTORS BASED ON RELAXED LATTICE REDUCTION

(75) Inventors: Ying Hung Gan, Hong Kong (CN); Wai Ho Mow, Hong Kong (CN)

(73) Assignee: Hui Long Fund Limited Liability Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/348,469

(22) Filed: Jan. 11, 2012

(65) Prior Publication Data

US 2012/0114058 A1    May 10, 2012

Related U.S. Application Data

(63) Continuation of application No. 12/023,780, filed on Jan. 31, 2008, now Pat. No. 8,116,399.

(51) Int. Cl.
*H04L 27/06* (2006.01)
*H03D 1/00* (2006.01)

(52) U.S. Cl.
USPC .............................................. 375/267

(58) Field of Classification Search
USPC ................. 375/260, 348, 340, 341, 267
See application file for complete search history.

(56) References Cited

U.S. PATENT DOCUMENTS

| | | |
|---|---|---|
| 2005/0175122 A1 | 8/2005 | Nefedov et al. |
| 2006/0112049 A1* | 5/2006 | Mehrotra et al. ............... 706/46 |
| 2007/0201632 A1 | 8/2007 | Ionescu et al. |
| 2007/0217537 A1 | 9/2007 | Berenguer et al. |
| 2007/0230628 A1 | 10/2007 | You et al. |
| 2007/0268981 A1 | 11/2007 | Heiskala |
| 2008/0225976 A1 | 9/2008 | Prasad et al. |

OTHER PUBLICATIONS

Damien Stehle, Vincent Lefevre and Paul Zimmermann, "Searching Worst Cases of a One-Variable Function Using Lattice Reduction", LORIA/INRIA Lorraine, Technopole de Nancy-Brabois, France, IEEE, Mar. 2005.*
Babak Hassibi, et al. On the Sphere-Decoding Algorithm I. Expected Complexity. IEEE Transactions on Signal Processing, vol. 53, Issue 8, Part 1, Aug. 2005 pp. 2806-2818, Digital Object Identifier 10.1109/TSP.2005.850352  http://ieeexplore.ieee.org/search/search-result.jsp?query1=on+the+sphere-decoding+algorithm+i.+expected+complexity.
C. Ling. Towards Characterizing the Performance of Approximate Lattice Decoding in MIMO Communications. http://www.ntu.edu.sg/home5/PG01854370/congling/pdfdata/SCC06_Lattice.pdf. Last accessed Feb. 7, 2008, 6 pages, Apr. 3-7, 2006.

(Continued)

*Primary Examiner* — Aristocratis Fotakis
(74) *Attorney, Agent, or Firm* — Turocy & Watson, LLP

(57) ABSTRACT

System and methodologies for reduced-complexity signal detection and decoding in a wireless communication system are provided herein. Systems and methodologies presented herein can utilize a relaxed form of the Lenstra-Lenstra-Lovasz (LLL) lattice reduction algorithm to reduce the complexity of lattice reduction operations in the context of MIMO detection. Additional systems and methodologies presented herein can apply lattice reduction in the context of a maximum likelihood (ML) detector for spherical or elliptical lattice space-time (LAST) codes.

24 Claims, 8 Drawing Sheets

(56) References Cited

OTHER PUBLICATIONS

M. W. Ho. Maximum Likelihood Sequence Estimation From the Lattice Viewpoint. http://citeseer.ist.psu.edu/cache/papers/cs2/275/http:zSzzSzwww.ee.ust.hkzSz~eewhmowzSzdownloadzSzMPhil.pdf/mow91maximum.pdf. Last accessed Feb. 7, 2008, 101 pages, Sep. 1994.

M. W. Ho. Universal Lattice Decoding: Principle and Recent Advances. http://www.ee.ust.hk/~eewhmow/download/LatticeDecodeWCMC.pdf. Last accessed Feb. 7, 2008, 29 pages, 2003.

Michael Pohst. On the Computation of Lattice Vectors of Minimal Length, Successive Minima and Reduced Bases with Applications. ACM SIGSAM Bulletin, vol. 15, Issue 1 (Feb. 1981), Year of Publication: 1981 ISSN:0163-5824 http://portal.acm.org/citation.cfm?id=1089242.1089247. Last accessed Feb. 7, 2008, 8 pages.

K. Su, et al. Efficient maximum-likelihood decoding of spherical lattice space-time codes http://www.cl.cam.ac.uk/research/dtg/publications/public/dnc25/4_2006_conf_lasticc.pdf. Last accessed Feb. 7, 2008, 6 pages, 2006.

Dirk Wubben, et al. Near-Maximum-Likelihood Detection of MIMO Systems using MMSE-Based Lattice-Reduction http://www.ece.mtu_edu/faculty/ztian/ee5535s08/5-2-LLL.pdf. Last accessed Feb. 7, 2008, 5 pages, Jun. 2004.

H. Yao, et al. Lattice-Reduction-Aided Detectors for MIMO Communication Systems. http://www.rle.mit.edu/dspg/documents/Lattice-ReductionDet.pdf. Last accessed Feb. 7, 2008, 5 pages, Nov. 2002.

H. E. Gamal. Lattice Coding and Decoding Achieve the Optimal Diversity—Multiplexing Tradeoff of MIMO Channels. IEEE Transactions on Information Theory, vol. 50, No. 6, Jun. 2004 http://ieeexplore.ieee.org/iel5/18/28939/01302284.pdf?tp=&arnumber=1302284&isnumber=28939. Last accessed Feb. 22, 2008, 18 pages.

Erik Agrell, et al. Closest Point Search in Lattices. IEEE Transactions on Information Theory, vol. 48, No. 8, Aug. 2002. Publisher Item Identifier 10.1109/TIT.2002.800499. http://ieeexplore.ieee.org/iel5/18/21938/01019833.pdf?tp=&arnumber=1019833&isnumber=21938. Last accessed Mar. 10, 2008, 14 pages.

J. Jalden, et al. On the Complexity of Sphere Decoding in Digital Communications. IEEE Transactions on Signal Processing, vol. 53, No. 4, Apr. 2005. Digital Object Identifier 10.1109/TSP.2005.843746. http://ieeexplore.ieee.org/iel5/78/30539/01408197.pdf?tp=&arnumber=1408197&isnumber=30539. Last accessed Mar. 10, 2008, 11 pages.

C. Ling, et al. Multiple-Antenna Differential Lattice Decoding. IEEE Journal on Selected Areas in Communications, vol. 23, No. 9, Sep. 2005. Digital Object Identifier 10.1109/JSAC.2005.853795. http://ieeexplore.ieee.org/iel5/49/32269/01504915.pdf?tp=&arnumber=1504915&isnumber=32269. Last accessed Mar. 10, 2008, 9 pages.

M. Taherzadeh, et al. LLL Lattice-Basis Reduction Achieves the Maximum Diversity in MIMO Systems. In Proc. IEEE International Symposium on Information Theory (ISIT), Adelaide, Australia, Sep. 4-9, 2005. http://ieeexplore.ieee.org/iel5/10215/32581/01523552.pdf?tp=&arnumber=1523552&isnumber=32581. Last accessed Mar. 10, 2008, 9 pages.

W. H. Mow. Maximum Likelihood Sequence Estimation from the Lattice Viewpoint. Singapore ICCS/ISITA '92. http://ieeexplore.ieee.org/iel2/679/6474/00254963.pdf?tp=&arnumber=254963&isnumber=6474. Last accessed Mar. 10, 2008, 5 pages, 1992.

W. H. Mow. Maximum Likelihood Sequence Estimation from the Lattice Viewpoint. IEEE Transactions on Information Theory, vol. 40, Issue 5, Date: Sep. 1994, pp. 1591-1600, Digital Object Identifier 10.1109/18.333872 http://ieeexplore.ieee.org/iel1/18/7860/00333872.pdf?tp=&arnumber=333872&isnumber=7860. Last accessed Mar. 10, 2008, 10 pages.

E. Viterbo, et al. A Universal Lattice Code Decoder for Fading Channels. IEEE Transactions on Information Theory, vol. 45, Issue 5, Date: Jul. 1999, pp. 1639-1642. Publisher Item Identifier S 0018-9448(99)04380-1. http://ieeexplore.ieee.org/iel5/18/16706/00771234.pdf?tp=&arnumber=771234&isnumber=16706. Last accessed Mar. 10, 2008, 4 pages.

C, Windpassinger, et al. Lattice-Reduction-Aided Broadcast Precoding. IEEE Transactions on Communications, vol. 52, No. 12, Dec. 2004. Digital Object Identifier 10.1109/TCOMM.2004.838732. http://ieeexplore.ieee.org/iel5/26/29976/01369614.pdf?tp=&arnumber=1369614&isnumber=29976. Last accessed Mar. 10, 2008, 4 pages.

A. K. Lenstra, et al. Factoring Polynomials with Rational Coefficients. Math. Ann. 261, 515-534 (1982), 0025-5831/82/026 I/0S 15, Springer-Verlag. http://www.math.ru.nl/~bosma/onderwijs/voorjaar07/LLL.pdf. Last accessed Mar. 11, 2008, 20 pages.

C. P. Schnorr, et al. Lattice Basis Reduction: Improved Practical Algorithms and Solving Subset Sum Problems. Mathematical Programming, 66(1-3):181-199, Aug. 1994. SSDIOO25-5610(93)E0111-Q. http://www.springerlink.com/content/p3511w638h45616u/fulltext.pdf. Last accessed Mar. 11, 2008, 19 pages.

OA dated Nov. 5, 2010 for U.S. Appl. No. 12/023,780, 27 pages.

Di Wu, Eilert, J and Dake Liu, "Lattice-Reduction Aided Multi-User STBC Decoding with Resource Constraints", Linkoping University, Sweden, Sep. 2007, IEEE.

Chan-ho An, Janghoon Yang and Dong Ku Kim, "Lattice Reduction Aided Detection with Reduced Complexity for Time-Correlated MIMO Channel", Yonsei University, Seoul, Nov. 2007, IEEE.

Berenguer, I, Xiaodong Wang, Prasad, N, Jibing Wang and Madihian, M, "Design of minimum-error-rate lattice (space-time) codes via stochastic optimization and gradient estimation". Cambridge University, Columbia University, Qualcomm and NEC Laboratories, Dec. 2, 2005.

Ying Hung Gan, Cong Ling and Wai Ho Mow, "Complex lattice Reduction Algorithm for Low-Complexity MIMO Detection", Jul. 2006, IEEE.

Jun Niu and I-Tai Lu, "A New Lattice-Reduction-Based Receiver for MIMO Systems", Polytechnic University, Brooklyn, Mar. 2007, IEEE.

OA dated Mar. 31, 2011 for U.S. Appl. No. 12/023,780, 19 pages.

Henrik Koy and Claus Peter Schnorr, "Segment LLL-Reduction of Lattice Bases", University of Frankfurt, Germany, 2001.

Notice of Allowance dated Oct. 11, 2011 for U.S. Appl. No. 12/023,780, 19 pages.

Ying Hung Gan and Wai Ho Mow, "Complex Lattice Reduction Algorithms for Low-Complexity MIMO Detection", Hong Kong University of Science and Technology, IEEE, 2005.

Richard Lindner, "Lattices in Cryptography", Feb. 3, 2006.

\* cited by examiner

MULTIPLE-INPUT MULTIPLE-OUTPUT SIGNAL DETECTORS BASED ON RELAXED LATTICE REDUCTION

CROSS-REFERENCE

This application is a continuation of U.S. patent application Ser. No. 12/023,780, filed on Jan. 31, 2008, entitled "IMPROVED MULTIPLE-INPUT MULTIPLE-OUTPUT SIGNAL DETECTORS BASED ON RELAXED LATTICE REDUCTION", the entirety of which is herein incorporated by reference.

TECHNICAL FIELD

The present disclosure relates generally to wireless communications systems, and more particularly to techniques for signal detection and decoding in a wireless communication system.

BACKGROUND

In the area of communication systems, it has recently been discovered that by exploiting the linearity of a communication channel and the lattice structure of a modulation scheme, many signal detection problems can be formulated as a problem of finding a nearest lattice point. Examples of such signal detection problems include multiple-input multiple-output (MIMO) detection and decoding of various classes of space-time codes. Further, it has been shown that the relative degree of freedom provided by such lattice-based approaches in choosing a lattice basis can be a significant factor affecting the quality and efficiency of such approaches. For example, conventional low-complexity and highly sub-optimal MIMO detectors can be modified to provide detection that achieves full diversity without a significant sacrifice in complexity by employing lattice reduction of associated MIMO channel matrices.

However, the process of finding a good lattice basis reduction can be significantly complicated in many conventional lattice-based signal detection approaches as compared to other components of such approaches, such that the lattice reduction complexity of conventional lattice-based signal detection techniques often dominates the overall detection complexity. Moreover, this disparity in complexity generally becomes more significant as the dimension of the associated communication system increases. As a result, difficulties arise in applying conventional signal detection techniques in many communication systems, such as those where an associated channel matrix or related lattice basis undergo frequent changes. Accordingly, there exists a need in the art for lattice-based signal detection techniques that simplify the process of lattice reduction without significantly degrading detection performance.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The subject disclosure provides systems and methodologies for reduced-complexity signal detection and decoding in a wireless communication system. Various systems and methodologies presented herein can utilize a relaxed form of the Lenstra-Lenstra-Lovasz (LLL) lattice reduction algorithm, referred to herein as relaxed LLL, to reduce the complexity of lattice reduction operations in the context of a MIMO detection application. Relaxed LLL allows various constraints of the LLL reduction algorithm to be relaxed, which can result in a smaller amount of basis vector swapping and a reduction in the overall complexity and delay of an associated detector. As will be shown herein, the relaxed LLL algorithm can achieve full diversity for MIMO detection with a performance gap that is adjustable by a provided parameter.

Additional systems and methodologies presented herein can apply lattice reduction for realizing a maximum likelihood detector (MLD) for spherical lattice space-time (LAST) codes. As LAST codes are capable of achieving an optimal multiplexing-diversity tradeoff in MIMO systems, various systems and methodologies herein can apply one or more lattice reduction algorithms to realize a very efficient MLD for LAST codes.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed. The claimed subject matter is intended to include all such aspects and their equivalents. Other advantages and novel features of the claimed subject matter can become apparent from the following detailed description when considered in conjunction with the drawings.

DETAILED DESCRIPTION

Figure 1:
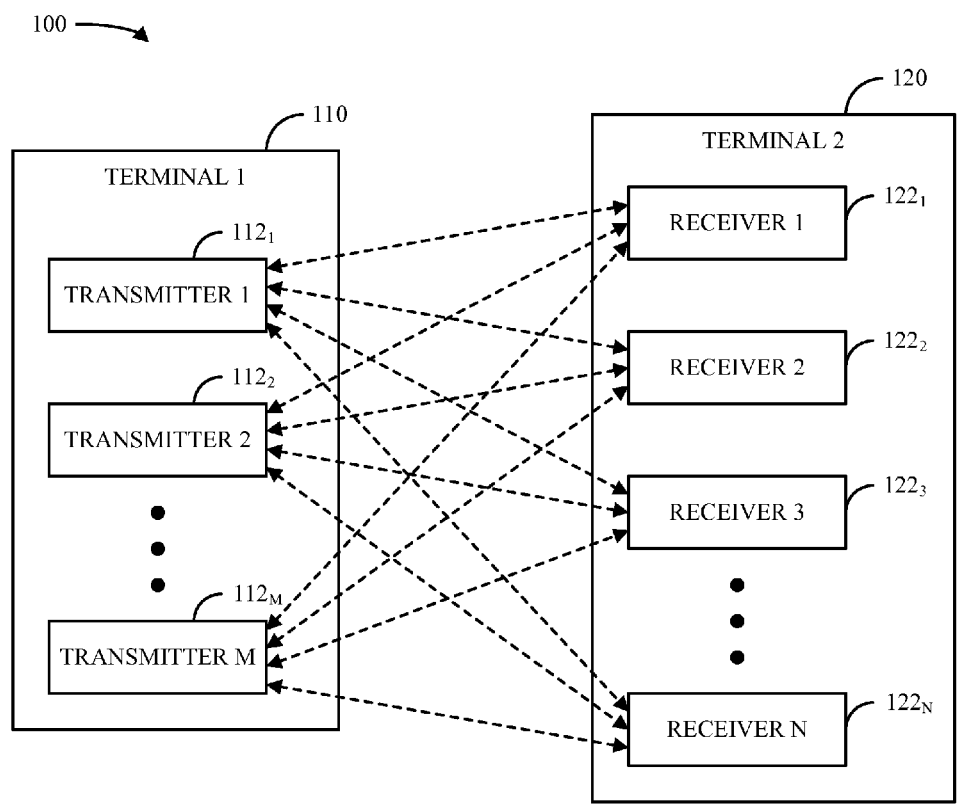
FIG. 1 is a high-level block diagram of a wireless communication system that can operate in accordance with various aspects described herein.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, the methods and apparatus of the claimed subject matter, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the claimed subject matter. The components may communicate via local and/or remote processes such as in accordance with a signal having one or more data packets (e.g., data from one component interacting with another component in a local system, distributed system, and/or across a network such as the Internet with other systems via the signal).

Referring to FIG. 1, a high-level block diagram of a wireless communication system 100 that can operate in accordance with various aspects described herein is illustrated. In one example, system 100 includes one or more terminals or stations 110 and/or 120, which can communicate with each other over a communication link or channel. While two terminals 110 and 120 are illustrated in system 100, it should be appreciated that system 100 can include any number of terminals. In addition, while the following description generally relates to multiple-input multiple-output (MIMO) wireless communication, it should further be appreciated that terminals 110 and/or 120 in system 100 can communicate using any suitable wired and/or wireless communication technology and that the various aspects described herein can be adapted to be utilized in connection with such communication technologies.

In accordance with one aspect, a first terminal 110 in system 100 can transmit data, control signaling, and/or any other suitable information via one or more transmitters 112 to a second terminal 120. Information transmitted by the first station 110 can be received at the second terminal 120 by one or more receivers 122. While system 100 generally illustrates a transmission of information from the first terminal 110 to the second terminal 120, however, it should be appreciated that terminals 110 and/or 120 in system 100 can be capable of both receiving and transmitting at one or more time intervals. For example, while not illustrated in system 100, the second terminal 120 can additionally communicate information to the first terminal 110 at a common time interval as a communication from the first terminal 110 to the second terminal 120 and/or at a different time interval.

In accordance with another aspect, communication can be conducted within system 100 through a MIMO channel as follows. In one example, a communication link can be established between m transmitters and n receivers within system 100. The transmitters and receivers that form the communication link can be respectively associated with single devices, such as transmitters 112 at terminal 110 and/or receivers 122 at terminal 120. Alternatively, transmitters and/or receivers that form a communication link within system 100 can be associated with multiple devices in system 100.

Using the above-described communication link, m signals $\{x_1, x_2, \ldots, x_m\}$ satisfying an average power constraint can be transmitted at each time instant using the m transmitters. Each of these transmitted signals can then reach all n receivers associated with the communication link. Upon receiving the signals, each receiver can detect a combination of respective signals from each of the transmitters and an additive white Gaussian (AWGN) noise parameter $\sigma^2$ having zero mean and variance per dimension. For the following description, it can be assumed that there are at least as many receivers as transmitters in the communication link, e.g., n≥m.

In one example, communications from the m transmitters to the n receivers in the communication link pass through a communication channel that can be modeled as an uncorrelated Rayleigh fading channel. Accordingly, all fading coefficients $h_{ij}$ between the i-th transmitter and j-th receiver are independent and identically distributed complex Gaussian random variables with zero mean and unit variance. Furthermore, the time-varying nature of the channel can be modeled with block fading, meaning that the characteristics of the channel remain fixed for a given period of time (e.g., a block) and then change at the next block independently of the channel characteristics of the previous block. This channel model can be expressed in matrix-vector form as follows:

$$y = Hx + W, \quad (1)$$

where H is the n×m complex channel matrix, x is the m×1 transmitted signal vector, w represents the AWGN noise vector, and y is the received signal vector. In full, the model given by Equation (1) can be expressed as follows:

$$\begin{bmatrix} y_1 \\ y_2 \\ \vdots \\ y_n \end{bmatrix} = \begin{bmatrix} h_{11} & \cdots & h_{1,m} \\ h_{21} & \cdots & h_{2,m} \\ \vdots & \ddots & \vdots \\ h_{n,1} & \cdots & h_{n,m} \end{bmatrix} \begin{bmatrix} x_1 \\ x_2 \\ \vdots \\ x_m \end{bmatrix} + \begin{bmatrix} w_1 \\ w_2 \\ \vdots \\ w_n \end{bmatrix}. \quad (2)$$

When space-time code is used by system 100, transmitted and received signals can represented by complex matrices of size m×t and n×t respectively, where t indicates a block length of t channel uses employed by the space-time code. Based on the block fading channel model described above, the effective channel model with space-time code can be expressed as follows:

$$\mathrm{vec}(Y) = {}'H\mathrm{vec}(X) + \mathrm{vec}(W), \text{or} \quad (3)$$

$$\bar{y} = {}'H\bar{x} + \bar{w}, \quad (4)$$

where $'H = I_t \otimes H$, $\otimes$ denotes the Kronecker product, $I_t$ is an t×t identity matrix, and $\bar{x} = \mathrm{vec}(X)$ is the "vectorization" of matrix X (e.g., the vector obtained by stacking the columns of the matrix X on top of one another).

Figure 2:
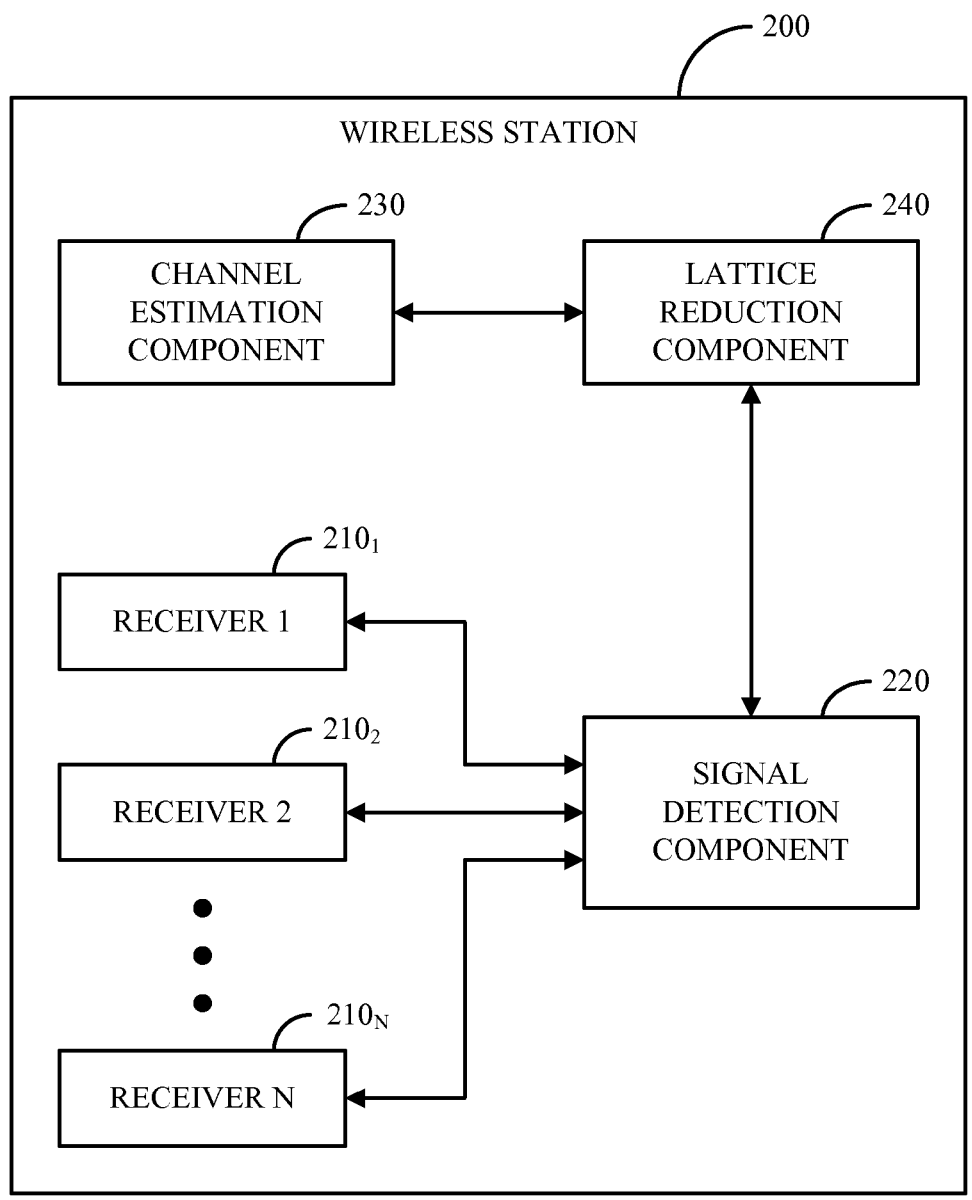
FIG. 2 is a block diagram of an example wireless station that can utilize lattice basis reduction to perform low-complexity signal detection in a wireless communication system in accordance with various aspects.

Referring now to FIG. 2, an example wireless station 200 that can utilize lattice basis reduction to perform low-complexity signal detection in a wireless communication system is illustrated. In one example, station 200 can include one or more receivers 210 that can receive signals from one or more other stations (e.g., station 110 in system 100) and/or other entities in an associated wireless communication system. Although not illustrated in FIG. 2, station 200 can additionally include one or more transmitters for transmitting information to other entities in the wireless communication system.

In accordance with one aspect, the output of receivers 210 can be passed to a signal detection component 220, which can analyze the receiver outputs for the presence of signals. For example, the signal detection component 220 can be utilized to distinguish signals received by the receivers 210 from periods of silence and/or noise. Additionally and/or alternatively, the signal detection component 220 can distinguish between various types of signals received by the receivers 210 (e.g., data, control signaling, etc.) and/or provide decoding or other processing functionality for such signals upon detection. To aid in the analysis performed by the signal detection component 220, station 200 can additionally employ a channel estimation component 230 to obtain and provide estimates of a communication channel through which signals pass from a transmitting entity(ies) in the wireless communication system to station 200. In the case of a MIMO communication channel, a channel estimate obtained by the channel estimation component 230 can be expressed in terms of a channel matrix. Further, to reduce the required complexity of the signal detection component 220 and/or to improve the performance of the signal detection component 220, a lattice reduction component 240 can be utilized at station 200 to analyze channel matrices obtained by channel estimation component 230 and obtain reduced lattice bases for those channel matrices that can be more efficiently utilized by the signal detection component 220.

By way of non-limiting example, techniques that can be utilized by the lattice reduction component 240 for lattice reduction and techniques that can be utilized by the signal detection component 220 based on lattice-reduced channel estimates are now described in further detail. In general, by exploiting the linearity of communication channels and the lattice structure of a modulation scheme, many detection problems can be interpreted as a problem of finding a nearest lattice point. In accordance with one aspect, this lattice-based approach to detection problems can be utilized by signal detection component 220 as the foundation of low-complexity high-performance lattice-based detection functionality. In one example, the lattice reduction component 240 can enable station 200 to freely select a lattice basis for signal detection. By allowing such a level of freedom in finding a good lattice basis, or equivalently a better representation of the communication channel, many traditional signal detectors can be made more effective.

However, the complexity of the lattice basis reduction process has conventionally dominated overall signal detection complexity. Thus, to overcome the effects of this complexity, lattice reduction in many conventional signal detectors is performed as a preprocessing stage such that its complexity is shared by symbols within a coherent time period. However, in situations such as those where a channel matrix changes rapidly or where a lattice basis changes every symbol period, the complexity of performing lattice reduction as a preprocessing step becomes prohibitive. Accordingly, to mitigate the effects of this complexity, techniques are proposed herein to reduce the complexity of lattice reduction so that efficient and high-performance signal detection can be achieved by station 200.

In accordance with various aspects described herein, the lattice reduction component 240 can utilize one or more number-theoretic lattice reduction algorithms that operate on a real-valued channel matrix. Because, as given above in Equation (1), a channel matrix can be expressed as a complex matrix H, the lattice reduction component 240 can transform a complex-valued channel matrix H into a real-valued equivalent matrix $H_R$ of doubled dimensions to facilitate processing of the channel matrix. In one example, this transformation can be performed as follows:

$$H_R = \begin{bmatrix} R(H) & -I(H) \\ I(H) & R(H) \end{bmatrix}, \tag{5}$$

where R(H) and I(H) respectively represent the real and imaginary parts of H. Based on the transformation given by Equation (5), the complex MIMO system model given by Equation (1) can further be replaced by its real equivalent model:

$$y_R = H_R x_R + w_R, \tag{6}$$

where $y_R = [R(y) \, I(y)]^T$ and similar definitions apply for $x_R$ and $w_R$.

In accordance with one aspect, an n-dimensional lattice $\Lambda$ in Euclidean space $^m$ can include the set of points $$\left\{ \sum_{i=1}^{n} c_i b_i : c_i \in {}^m \right\}$$

and can be expressed in matrix form as $\Lambda = \{Bc : c \in \epsilon^n\}$, where $B = [b_1 \ldots b_n]$ represents a basis of the lattice $\Lambda$. Thus, it can be observed that $\Lambda$ consists of all integral, linear combination of its basis vectors.

Further, it should be appreciated that a lattice can have infinitely many different bases. In general, it can be shown that any matrix B' such that B'=BU, where U is an unimodular matrix (e.g., |det U|=1) and all elements of U are integers, can generate the same lattice as B. Accordingly, it can be further shown that |det(B)|=|det(B')| for any two bases of the same lattice.

From a basis B, the set of orthogonal vectors generated by the Gram-Schmidt Orthogonalization (GSO) procedure as known generally in the art can be represented as $\{b_1^*, \ldots, b_n^*\}$, which span the same space as $\{b_1, \ldots, b_n\}$. In addition, the notation $\mu_{ij}$ can be defined as $$\mu_{ij} = \frac{\langle b_i, b_j^* \rangle}{\|b_j^*\|^2}.$$

As used herein, the squared norm of $b_i^*$ is denoted by the calligraphic letter $B_i = \|b_i^*\|^2$.

In one example, the orthogonality defect of a basis B, denoted as $\rho(B)$, can be utilized to measure how close a basis is to orthogonal. The orthogonality defect of basis B can be defined as follows:

$$\rho(B) = \frac{\prod_{i=1}^{n} \|b_i\|}{\prod_{i=1}^{n} \|b_i^*\|} = \frac{\prod_{i=1}^{n} \|b_i\|}{\det(B)}. \tag{7}$$

From Equation (7), it can be seen that $\rho(B) \geq 1$ and that $\rho(B)$ will equal 1 if and only if B is orthogonal.

In accordance with another aspect, a lattice can have multiple bases that can be utilized for low-complexity signal detection with varying degrees of effectiveness. As one of skill in the art can appreciate, bases with properties such as short or close to orthogonal vectors are generally more favorable for use in signal detection. Accordingly, lattice reduction 240 can perform one or more lattice basis reduction (or simply lattice reduction) algorithms. In general, lattice reduction can be regarded as a problem of finding a short lattice basis from an existing basis. Generally, a short lattice basis obtained by LLL comprises vectors that have small norms. For example, given a basis as input, a lattice reduction algorithm can output a basis with favorable properties for signal detection.

An example of a technique that can be utilized for lattice reduction is Lenstra-Lenstra-Lovasz (LLL) reduction. As a polynomial time algorithm for LLL reduction exists, LLL reduction is often used for applications such as signal detection and public key cryptography. As generally known in the art, exact optimization of a lattice basis (e.g., the problem of finding a basis formed by vectors of strictly minimal lengths) is NP-hard and therefore intractable even for low dimensions. However, by utilizing LLL reduction, an approximate solution to the lattice reduction problem can be obtained in polynomial time for all dimensions. In one example, LLL reduction utilizes a Gram-Schmidt orthogonalization process, with the modification that orthogonalization coefficients are approximated by integers, while at the same time attempting to obtain vectors that meet predetermined length criteria. As a result, reduced bases constructed using LLL reduction by default exhibit both orthogonality and minimality.

By way of additional detail, an LLL lattice reduction algorithm can operate as follows. As defined by the LLL reduction algorithm, a basis B of a lattice is LLL-reduced if both of the following conditions are satisfied:

$$|\mu_{ij}| \leq 0.5 \tag{8}$$

for $1 \leq j < i \leq n$, and $$H_k \geq (\delta - |\mu_{k,k-1}|^2) H_{k-1} \tag{9}$$

for $1 < k \leq n$, where $\delta$ with $\frac{1}{4} < \delta < 1$ is a factor that can be selected to achieve a good quality-complexity tradeoff. Additionally, by defining $$\alpha = \frac{4}{4\delta - 1},$$

it can be shown that a LLL-reduced basis has the following properties:

$$\|b_1\| \leq \alpha^{n(n-1)/2} \lambda(\Lambda), \tag{10}$$

$$\|b_1\| \leq \alpha^{n(n-1)/4} \det(\Lambda)^{1/n}, \tag{11}$$

$$\rho(B) \leq \alpha^{n(n-1)/4}. \tag{12}$$

As illustrated by Equations (10)-(12), the vectors of an LLL-reduced basis are generally short and close to orthogonal.

As is generally known in the art, LLL reduction is often used for signal detection due to the fact that a polynomial running time algorithm for LLL reduction exists. This algorithm can be summarized by the following three steps. First, a GSO procedure is performed to compute. Next, size reduction is performed as a process aimed at making basis vectors shorter and closer to orthogonal by asserting Equation (8) for all $j<i$. Third, basis vector swapping is performed, such that two consecutive basis vectors $h_{k-1}$ and $h_k$ are swapped if the condition expressed by Equation (9) is violated. The idea of basis vector swapping is that, after swapping, size reduction can be repeated to make basis vectors shorter. The size reduction and basis vector swapping steps can then iterate until Equation (9) is satisfied for all pairs of $h_{k-1}$ and $h_k$. The resultant basis from this procedure is thereby LLL-reduced. It should be appreciated, however, that despite the polynomial-time nature of this algorithm, the overall complexity of lattice reduction nonetheless often dominates the complexity of lattice-based signal detection. Accordingly, algorithms are described herein that can be utilized by station 200 to perform lattice reduction and signal detection based thereon more efficiently and with less complexity.

Figure 3:
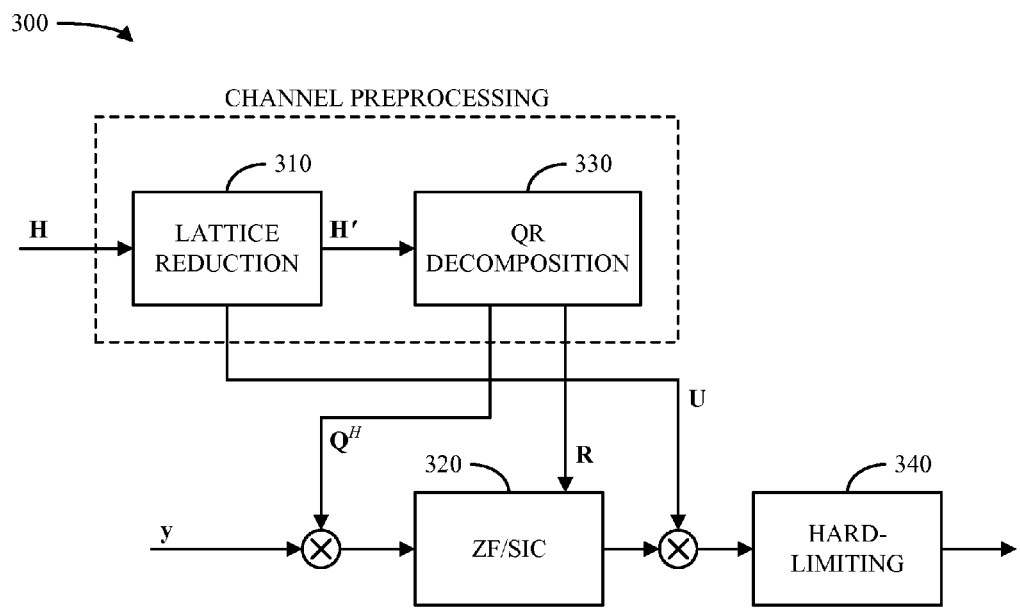
FIG. 3 is a block diagram of a system for communication channel processing and signal detection in accordance with various aspects.

Turning now to FIG. 3, a block diagram of a system 300 for communication channel processing and signal detection in accordance with various aspects is provided to give additional context regarding the operation of lattice reduction component 240 and signal detection component at station 200. In accordance with one aspect, system 300 can operate as follows. As seen from the system model given by Equation (1), a received vector y can be expressed as a lattice point Hx corrupted by a noise vector w. Thus, detecting a MIMO symbol can be viewed in the context of system 300 as solving the closest vector problem (CVP)—e.g., given a lattice and an arbitrary query point, finding a lattice point among all lattice points that is closest to the query point with respect to Euclidean distance.

In one example, the channel matrix H can be processed by a lattice reduction block 310 to transform H into a reduced basis H'=HU, where U is an unimodular matrix. As a result of the lattice reduction performed by lattice reduction block 310, the following channel model can be obtained:

$$y = H'U^{-1}x + w = B'x' + w, \tag{13}$$

where $x'=U^{-1}x$. Following this lattice reduction, a traditional signal detector 320 can be applied on the reduced basis. In one example, the signal detector 320 can perform signal detection based on zero forcing (ZF), successive interference cancellation (SIC), and/or any other signal detection algorithms that are known in the art or that may become known. In the specific example of a signal detector 320 that utilizes SIC, the reduced basis can be further processed by a QR decomposition block 330 prior to signal detection to separate the reduced basis into an orthogonal Q component and a triangular R component. In another specific example, a signal detector 320 based on zero forcing can obtain the following estimation:

$$\hat{x}' = [H'^{-1}y], \tag{14}$$

where [·] represents an integer rounding operator. Once an estimation as given by Equation (14) is obtained, the estimation can be transformed to $\hat{x}=q(U\hat{x}')$ by a hard-limiting component 340.

With regard to the estimation obtained by the signal detector and subsequent hard-limiting described above, it should be appreciated that the shaping region of the constellation utilized by system 300 undergoes a linear transformation U. As such, there is generally not an effective way to control the boundary when making signal detection decisions. Thus, the boundary is generally ignored in implementations of system 300, e.g., detection is performed as if an infinite lattice is utilized. While it can be appreciated that this approach can cause boundary errors, these boundary errors are generally insignificant for large alphabet sizes.

In one example, the diversity order of the detection scheme illustrated by system 300 can be defined as follows:

$$-\lim_{SNR \to \infty} \frac{\log P_e}{\log SNR}, \quad (15)$$

where $P_e$ is the error probability. Based on this definition, it can be shown that lattice-reduction-aided detection can achieve the full diversity of a MIMO fading channel as follows. For a system with a high signal-to-noise (SNR) ratio, the error rate performance of maximum likelihood (ML) detection can be characterized by the minimum distance of its decision region. This distance can also be expressed as $\lambda$ and represented as the norm of the shortest vector in a lattice. On the other hand, the minimum distance of the decision region of a ZF detector is related to the norm of basis vectors and the acute angles between them. For an LLL-reduced basis, it can be shown by Equations (10)-(12) that both minimum distances are upper bounded by $\lambda$ times a constant, which is a function of the dimension n only. Therefore, for a fixed dimension n and a large SNR, the performance gap between LLL-ZF and ML detection can be shown to be constant. Because it is known in the art that ML detection can achieve full diversity, it can therefore be appreciated that LLL-ZF can achieve full diversity as well.

Returning to FIG. 2, a new algorithm for lattice reduction that can be utilized by lattice reduction 240 is described in accordance with various aspects. The new algorithm, referred to herein as relaxed-LLL reduction, has less complexity than traditional LLL reduction and can still achieve full diversity in a similar manner to traditional LLL reduction. In accordance with one aspect, relaxed-LLL reduction can be performed by relaxing LLL conditions, thereby allowing an expected amount of basis vector swapping to be reduced without removing the upper bounds on basis vector norm or orthogonality defect.

In accordance with another aspect, the lattice reduction component 240 can perform relax the conditions of LLL based on two observations. First, it can be observed that the LLL factor $\delta$ needs not be fixed throughout the execution of lattice reduction. In fact, it is possible to set $\delta$ to vary with factors such as processing time spent or a current working lattice dimension. Second, it can be observed that the first few reduction steps carried out by the lattice reduction component 240 are the most crucial. After the first few steps, the criteria for a reduced basis can be relaxed without a significant degradation in quality.

Based on the above observations, relaxed-LLL reduction can be carried out by the lattice reduction component 240 such that the LLL condition relaxes exponentially with the reduction step. More specifically, the condition expressed above by Equation (9) for conventional LLL reduction can be modified as follows:

$$H_k \geq (\delta - |\mu_{k,k-1}|^2)^{i^\varepsilon} H_{k-1}, \quad (16)$$

where $0 < \varepsilon < 1$ is a user-defined adjustment factor introduced for further fine-tuning the performance-complexity tradeoff of the new lattice reduction scheme.

In accordance with one aspect, it can be shown that the relaxed-LLL reduction algorithm, like the traditional LLL reduction algorithm, can achieve the full diversity of a MIMO fading channel. More particularly, it can be observed that the reduced basis obtained by relaxed-LLL as specified above can have upper bounds similar to those expressed by Equations (10)-(12) above that are bounded by a constant which is a function of the dimension n only. Thus, for a fixed dimension n and large SNR, the performance gap between relaxed-LLL-ZF and ML detection is a constant. Accordingly, since it is known that ML detection can achieve full diversity, it can be deduced that relaxed-LLL-ZF can also achieve full diversity in a similar manner to that described above for the traditional LLL algorithm.

In accordance with another aspect, it can be proven that relaxed-LLL can achieve full diversity as follows. In general, an m×n real matrix $B = [b_1 \ldots b_n]$ can be considered that generates an n-dimensional real lattice $\Lambda$. If the matrix B satisfies the relaxed-LLL conditions given by Equations (8) and (16), then it can be proven as follows that the orthogonality defect $\rho(B)$ of B is upper bounded by the following:

$$\rho(B) \leq \alpha \frac{n(n-1)(2n-1)}{3}, \quad (17)$$

where $\alpha = 4/(4\delta - 1)$.

First, the relaxed-LLL condition can be restated as follows:

$$\|b_i^*\|^2 \geq (\delta - \mu_{i,i-1}^2)^{i^\varepsilon} \|b_{i-1}^*\|^2. \quad (18)$$

Thus, by induction, the following equation:

$$\|b_i^*\|^2 \geq \prod_{k=j+1}^{i} (\delta - \mu_{k,k-1}^2)^{k^\varepsilon} \|b_j^*\|^2 \quad (19)$$

can be obtained for $j < i$. By defining $$\alpha = \frac{4}{4\delta - 1},$$

it can then be observed that $$\|b_i^*\|^2 \geq \prod_{k=j+1}^{i} \alpha^{-k^\varepsilon} \|b_j^*\|^2 \quad (20)$$

since $\mu_{k,k-1}^2 < 1/4$ for all k. Moreover, the following inequalities follow from Equation (20):

$$\|b_i^*\|^2 \geq \alpha^{-\sum_{k=j+1}^{i} k^\varepsilon} \|b_j^*\|^2 \quad (21)$$

$$\geq \alpha^{(j-i)i^\varepsilon} \|b_j^*\|^2. \quad (22)$$

It can be seen that the inequality given by Equation (22) comes from the fact that $\alpha^{i^\varepsilon} > \alpha^{j^\varepsilon}$ for $j < i$.

Next, the GSO procedure can be utilized to obtain the following:

$$\|b_i\|^2 = \|b_i^*\|^2 + \sum_{j=1}^{i} \mu_{ij}^2 \|b_j^*\|^2 \quad (23)$$

$$\leq \|b_i^*\|^2 + \frac{1}{4} \sum_{j=1}^{i} \|b_j^*\|^2 \quad (24)$$

-continued $$\leq \|b_i^*\|^2 + \frac{1}{4}\sum_{j=1}^{i}\alpha^{(i-j)i^\varepsilon}\|b_i^*\|^2 \quad (25)$$

$$\leq \|b_i^*\|^2\left(1 + \frac{1}{4}\sum_{j=1}^{i}\alpha^{(i-j)i^\varepsilon}\right). \quad (26)$$

From the above equations, the term $$\sum_{j=1}^{i}\alpha^{(i-j)i^\varepsilon}$$

can then be isolated. Using the formula for calculating the sum of geometric series, the following can be found:

$$\sum_{j=1}^{i}\alpha^{(i-j)i^\varepsilon} = \frac{\alpha^{i^{\varepsilon+1}} - \alpha^{i^\varepsilon}}{\alpha^{i^\varepsilon} - 1} \quad (27)$$

$$= \frac{\alpha^{i^\varepsilon}}{\alpha^{i^\varepsilon} - 1}\left(\alpha^{i^{\varepsilon+1} - i^\varepsilon} - 1\right) \quad (28)$$

$$= \frac{1}{1 - \alpha^{-i^\varepsilon}}\left(\alpha^{i^{\varepsilon+1} - i^\varepsilon} - 1\right) \quad (29)$$

$$\leq 4\left(\alpha^{i^{\varepsilon+1} - i^\varepsilon} - 1\right). \quad (30)$$

It should be appreciated that the inequality given in Equation (30) is valid because $\alpha^{-i^\varepsilon} \leq (3/4)^{-i^\varepsilon} < 3/4$.

From the above equations, the upper bound on $\|b_i\|^2$ as given by Equation (26) can be simplified to the following:

$$\|b_i\|^2 \leq (\alpha^{i^{\varepsilon+1} - i^\varepsilon})\|b_i^*\|^2. \quad (31)$$

Finally, the squared orthogonality defect $\rho^2(B)$ can be found as follows:

$$\rho^2(B) = \prod_{i=1}^{n}\frac{\|b_i\|^2}{\|b_i^*\|^2} \quad (32)$$

$$\leq \prod_{i=1}^{n}\left(\alpha^{i^{\varepsilon+1} - i^\varepsilon}\right) \quad (33)$$

$$= \alpha^{\sum_{i=1}^{n}i^\varepsilon(i-1)} \quad (34)$$

$$\leq \alpha^{\sum_{i=1}^{n}i^{\varepsilon+i}} \quad (35)$$

$$\leq \alpha^{\sum_{i=1}^{n}i^2} \quad (36)$$

$$= \alpha^{\frac{n(n-1)(2n-1)}{6}}. \quad (37)$$

Thus, the upper bound on orthogonality defects given by Equation (17) follows from Equations (31)-(37).

Figure 4:
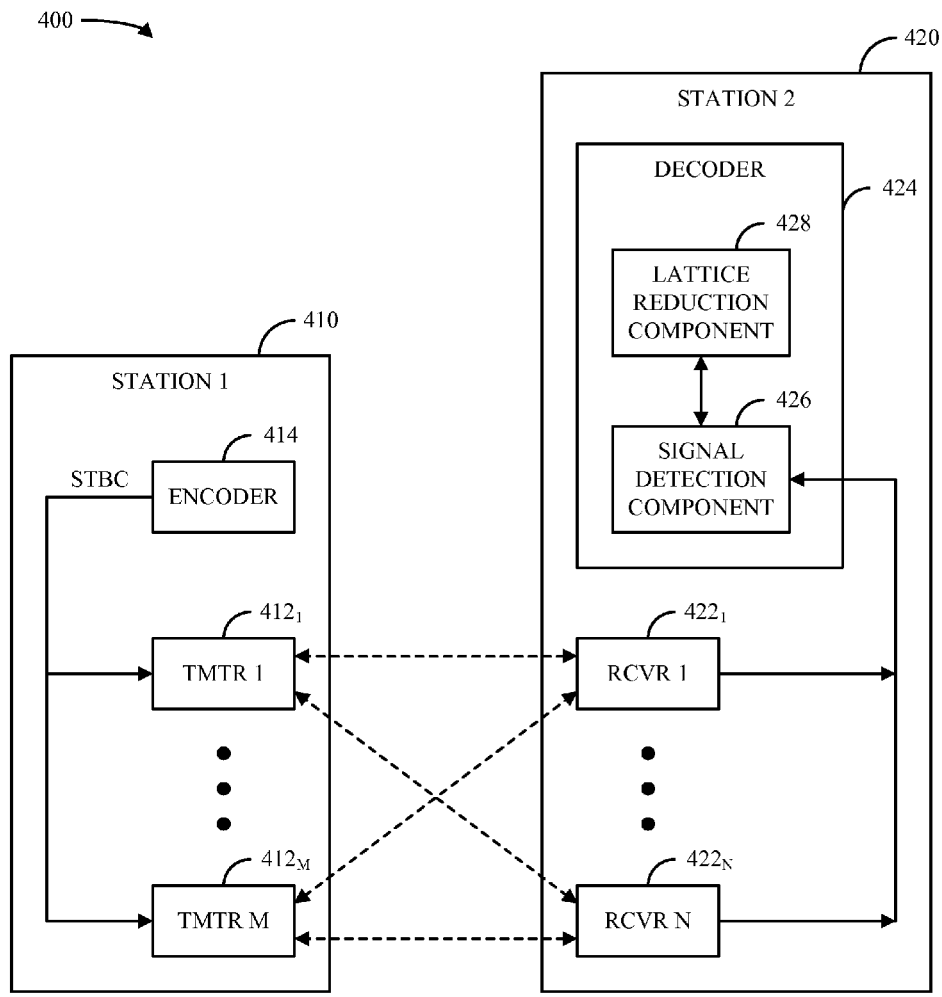
FIG. 4 is a block diagram of a system for decoding a lattice space-time (LAST) code in accordance with various aspects.

Referring to FIG. 4, a system 400 for decoding a lattice space-time (LAST) code in accordance with various aspects is illustrated. In one example, system 100 includes one or more stations 410 and/or 420, which can communicate with each other over a MIMO channel. While two stations 410 and 420 are illustrated in system 400, it should be appreciated that system 400 can include any number of terminals. In a similar manner to that described with respect to system 100 supra, a first station 410 in system 400 can transmit data, control signaling, and/or any other suitable information via one or more transmitters (TMTRs) 412 to a second terminal 420, at which the information can be received by one or more receivers (RCVRs) 422.

In contrast to system 100, the first station 410 in system 400 can utilize space-time block codes (STBCs) to transmit information to the second station 420. In one example, an encoder 414 at the first station 410 can provide a STBC to transmitters 412 for use in encoding and transmitting information to the second station 420. In accordance with one aspect, MIMO transmissions conducted without the use of STBCs, such as the communication illustrated by system 100, achieve maximum spatial multiplexing gain since each transmitter is transmitting an independent data stream. In contrast, the use of a STBC allows processing or coding of information across different transmitters, thereby improving the error rate performance of the system in terms of diversity order at the cost of multiplexing gain.

In one example, a STBC provided by encoder 414 can be a lattice space-time (LAST) code. In accordance with one aspect, the objective of a LAST code is to carve a space-time code directly from a properly constructed lattice. A MIMO system utilizing such a space-time code can be modeled as follows:

$$\bar{y} = \mathcal{H}\bar{x} + \bar{w}. \quad (38)$$

According to an aspect, instead of being a matrix formed by modulation symbols, the vectorized transmitted matrix $\bar{x}$ as used in Equation (38) above can be selected from a codebook C. The codebook C can be constructed by an mt-dimensional lattice with generator matrix G, denoted as $\Lambda(G)$, and a shaping region $S \in \mathbb{R}^{mt}$. The codebook can further be given by the intersection of the lattice with the shaping region as follows:

$$C = \Lambda(G) \cap S. \quad (39)$$

It can additionally be appreciated that when $G = I_{mt}$ and S is a hypercube, a LAST coded system degenerates to an uncoded MIMO system.

At the second station 420, information transmitted from transmitters 412 according to a STBC such as a LAST code can be received at the receivers 422 and provided to a decoder 424, which can process the received information and the STBC to obtain the information transmitted by the first station 410. In accordance with one aspect, the decoder 424 at the second station 420 can employ a signal detection component 426 and a lattice reduction component 428, which can respectively operate in a similar manner to the signal detection component 220 and lattice reduction component 240 illustrated in FIG. 2, to process received information. In one example, LAST codes based on a random generator matrix G and a spherically shaped shaping region S can achieve an optimal multiplexing-diversity tradeoff under ML decoding. Thus, decoder 424 can perform ML decoding that can be modeled as the minimization of the squared Euclidean distance metric to a target $\bar{y}$ over the codebook C as follows:

$$\hat{x} = \underset{\bar{x} \in C}{\operatorname{argmin}} \|\bar{y} - \mathcal{H}\bar{x}\|^2. \quad (40)$$

Because $C \subset \Lambda(G)$, it can be appreciated that the problem expressed by Equation (40) can be viewed as a constrained closest lattice point search with generator $\mathcal{H}G$.

By way of specific, non-limiting example, information can be transmitted from the first station 410 to the second station 420 using a spherical LAST code. In accordance with one aspect, decoder 424 can utilize various algorithms for efficient ML decoding of such a spherical LAST code, such as a tree-based detector framework similar to sphere decoders conventionally used for uncoded MIMO ML detection. In accordance with another aspect, the complexity of such algorithms for ML decoding of a spherical LAST code can be further reduced by utilizing lattice detection via the lattice reduction component 428. Particularly with regard to a sphere-decoder-like tree-based decoder for spherical LAST codes, the initial state of the decoder 424 is a significant factor in the complexity of the decoder 424. By performing lattice reduction prior to decoding, the initial state of the decoder 424 can be greatly improved at moderate SNR levels, leading to a significant reduction in complexity. An example technique that can be utilized by decoder 424 for efficient ML decoding of a spherical LAST code in accordance with various aspects is provided in the following description.

Due to the spherical shaping region of spherical LAST codes, traditional sphere decoders cannot be used directly because of difficulties experienced by such decoders in determining the boundary of the shaping region, leading to leading to inefficient ML decoding. These difficulties of traditional decoders are often referred to in the art as the boundary control problem. To mitigate the effects of the boundary control problem, previous algorithms, such as the modified sphere decoder (MSD), have been proposed for decoding of a spherical LAST code. In general, the MSD projects an ellipsoid formed by the deformation of a spherical shaping region by the channel (e.g., 'HC) to planes with basis vectors as normals to determine the search range for decoding.

In accordance with one aspect, decoder 424 can further reduce the complexity of the MSD by employing lattice reduction via the lattice reduction component 428. In a similar manner to that described above for an uncoded system, the lattice reduction component 428 can find a reduced lattice basis, based on which the decoder 424 can perform decoding as if the reduced basis is the actual channel. In one example, the transformed shaping region resulting from processing by the lattice reduction component 428 can be expressed as 'H'S. Further, as it can be appreciated that this transformed shaping region is still an ellipsoid, the boundary control issue noted above can be resolved in a similar manner to the conventional MSD.

As noted above, the overall complexity of sphere decoders and the MSD is proportional to the number of intermediate lattice points between an initial decoder estimate and a final optimal solution. Accordingly, the use of a reduced basis can greatly improve the accuracy of an initial guess at moderate-to-high SNR levels, thereby reducing the complexity of an associated decoder significantly.

Figure 5:
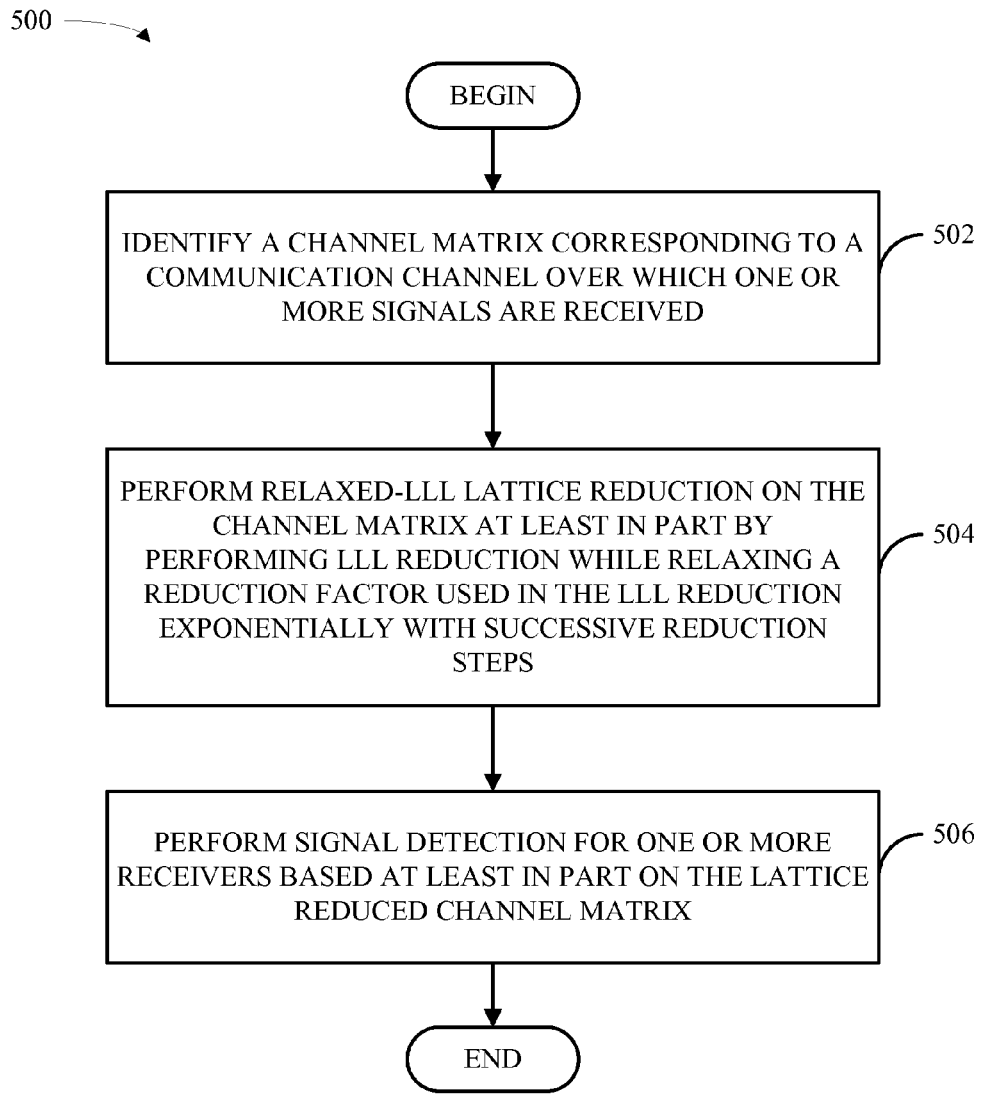
FIG. 5 is a flowchart of a method of signal detection in a wireless communication system in accordance with various aspects.
Figure 6:
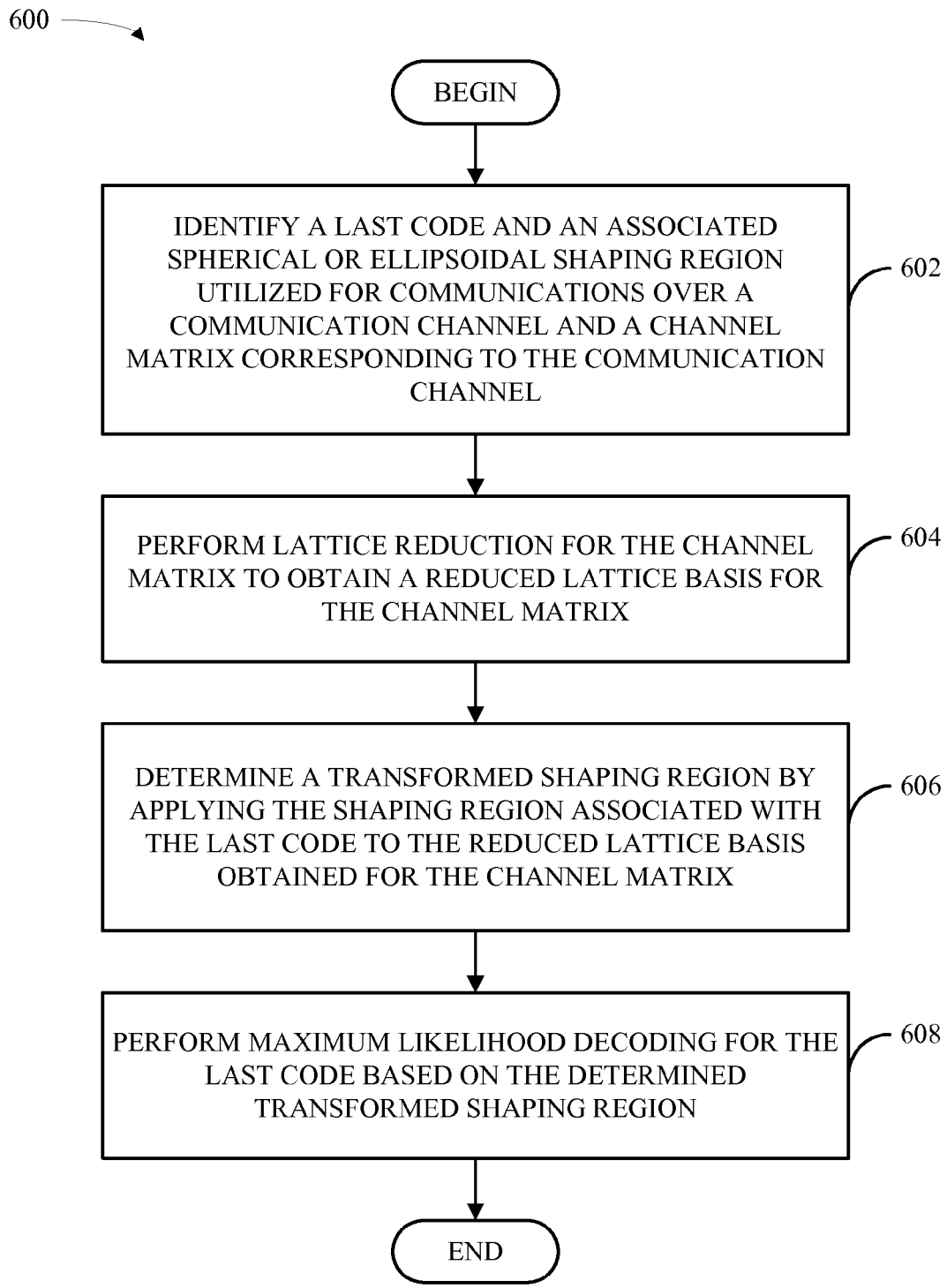
FIG. 6 is a flowchart of a method of decoding a LAST code in a wireless communication system in accordance with various aspects.

Referring now to FIGS. 5-6, methodologies that can be implemented in accordance with various aspects described herein are illustrated. While, for purposes of simplicity of explanation, the methodologies are shown and described as a series of blocks, it is to be understood and appreciated that the claimed subject matter is not limited by the order of the blocks, as some blocks may, in accordance with the claimed subject matter, occur in different orders and/or concurrently with other blocks from that shown and described herein. Moreover, not all illustrated blocks may be required to implement the methodologies in accordance with the claimed subject matter.

Furthermore, the claimed subject matter may be described in the general context of computer-executable instructions, such as program modules, executed by one or more components. Generally, program modules include routines, programs, objects, data structures, etc., that perform particular tasks or implement particular abstract data types. Typically the functionality of the program modules may be combined or distributed as desired in various embodiments. Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

Referring to FIG. 5, a method 500 of signal detection in a wireless communication system is illustrated. At 502, a channel matrix is identified (e.g., by a channel estimation component 230) that corresponds to a communication channel over which one or more signals are received (e.g., by one or more receivers 210). At 504, relaxed-LLL lattice reduction is performed on the channel matrix identified at 502 (e.g., by a lattice reduction component 240) at least in part by performing LLL reduction while relaxing a reduction factor used in the LLL reduction exponentially with successive reduction steps. At 506, signal detection is performed (e.g., by a signal detection component 220) for one or more receivers based at least in part on the lattice-reduced channel matrix obtained at 504.

Turning now to FIG. 6, a method 600 of decoding a LAST code in a wireless communication system is illustrated. At 602, a LAST code and an associated spherical or ellipsoidal shaping region utilized for communication over a communication channel (e.g., by an encoder 414 and/or transmitters 412) as well as a channel matrix corresponding to the communication channel are identified. At 604, lattice reduction is performed for the channel matrix identified at 602 (e.g., by a lattice reduction component 428) to obtain a reduced lattice basis for the channel matrix. At 606, a transformed shaping region is determined (e.g., by a decoder 424 and/or a signal detection component 426) by applying the shaping region associated with the LAST code identified at 602 to the reduced lattice basis obtained at 604 for the channel matrix. At 608, ML decoding for the LAST code is performed based on the transformed shaping region determined at 606.

Figure 7:
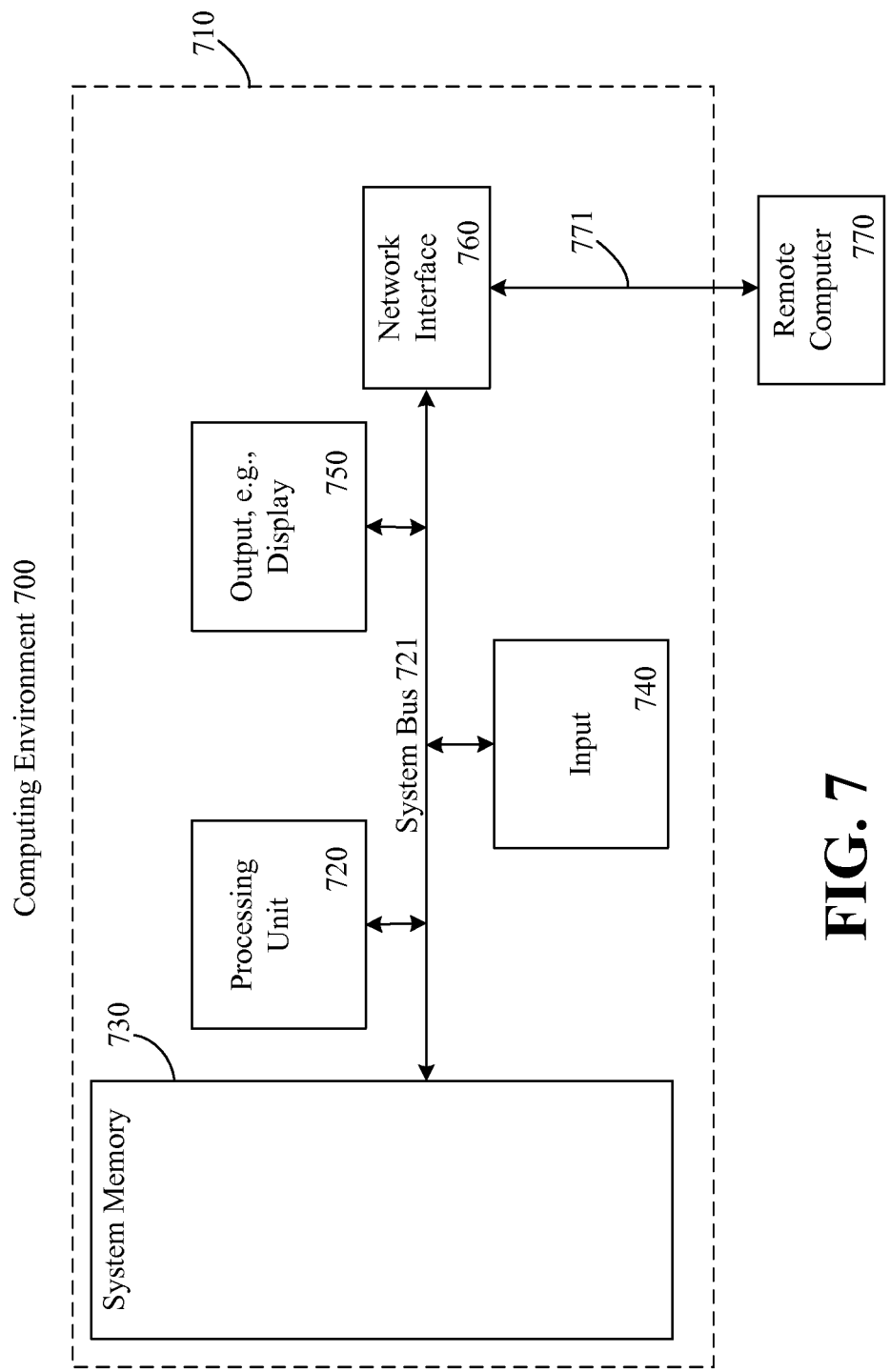
FIG. 7 is a block diagram of an example operating environment in which various aspects described herein can function.

Turning to FIG. 7, an exemplary non-limiting computing system or operating environment in which various aspects described herein may be implemented is illustrated. One of ordinary skill in the art can appreciate that handheld, portable and other computing devices and computing objects of all kinds are contemplated for use in connection with the claimed subject matter, e.g., anywhere that a communications system may be desirably configured. Accordingly, the general purpose remote computer described below in FIG. 7 is but one example of a computing system in which the claimed subject matter can be implemented.

Although not required, the claimed subject matter can partly be implemented via an operating system, for use by a developer of services for a device or object, and/or included within application software that operates in connection with one or more components of the claimed subject matter. Software may be described in the general context of computer-executable instructions, such as program modules, being executed by one or more computers, such as client workstations, servers or other devices. Those skilled in the art will appreciate that the claimed subject matter can also be practiced with other computer system configurations and protocols.

FIG. 7 thus illustrates an example of a suitable computing system environment 700 in which the claimed subject matter may be implemented, although as made clear above, the computing system environment 700 is only one example of a suitable computing environment for a media device and is not intended to suggest any limitation as to the scope of use or functionality of the claimed subject matter. Further, the computing environment 700 is not intended to suggest any dependency or requirement relating to the claimed subject matter and any one or combination of components illustrated in the example operating environment 700.

With reference to FIG. 7, an example of a remote device for implementing various aspects described herein includes a general purpose computing device in the form of a computer 710. Components of computer 710 can include, but are not limited to, a processing unit 720, a system memory 730, and a system bus 721 that couples various system components including the system memory to the processing unit 720. The system bus 721 can be any of several types of bus structures including a memory bus or memory controller, a peripheral bus, and a local bus using any of a variety of bus architectures.

Computer 710 can include a variety of computer readable media. Computer readable media can be any available media that can be accessed by computer 710. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 710. Communication media can embody computer readable instructions, data structures, program modules or other data in a modulated data signal such as a carrier wave or other transport mechanism and can include any suitable information delivery media.

The system memory 730 can include computer storage media in the form of volatile and/or nonvolatile memory such as read only memory (ROM) and/or random access memory (RAM). A basic input/output system (BIOS), containing the basic routines that help to transfer information between elements within computer 710, such as during start-up, can be stored in memory 730. Memory 730 can also contain data and/or program modules that are immediately accessible to and/or presently being operated on by processing unit 720. By way of non-limiting example, memory 730 can also include an operating system, application programs, other program modules, and program data.

The computer 710 can also include other removable/non-removable, volatile/nonvolatile computer storage media. For example, computer 710 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 721 through a non-removable memory interface such as an interface, and a magnetic disk drive or optical disk drive can be connected to the system bus 721 by a removable memory interface, such as an interface.

A user can enter commands and information into the computer 710 through input devices such as a keyboard or a pointing device such as a mouse, trackball, touch pad, and/or other pointing device. Other input devices can include a microphone, joystick, game pad, satellite dish, scanner, or the like. These and/or other input devices can be connected to the processing unit 720 through user input 740 and associated interface(s) that are coupled to the system bus 721, but can be connected by other interface and bus structures, such as a parallel port, game port or a universal serial bus (USB). A graphics subsystem can also be connected to the system bus 721. In addition, a monitor or other type of display device can be connected to the system bus 721 via an interface, such as output interface 750, which can in turn communicate with video memory. In addition to a monitor, computers can also include other peripheral output devices, such as speakers and/or a printer, which can also be connected through output interface 750.

The computer 710 can operate in a networked or distributed environment using logical connections to one or more other remote computers, such as remote computer 770, which can in turn have media capabilities different from device 710. The remote computer 770 can be a personal computer, a server, a router, a network PC, a peer device or other common network node, and/or any other remote media consumption or transmission device, and can include any or all of the elements described above relative to the computer 710. The logical connections depicted in FIG. 7 include a network 771, such local area network (LAN) or a wide area network (WAN), but can also include other networks/buses. Such networking environments are commonplace in homes, offices, enterprise-wide computer networks, intranets and the Internet.

When used in a LAN networking environment, the computer 710 is connected to the LAN 771 through a network interface or adapter. When used in a WAN networking environment, the computer 710 can include a communications component, such as a modem, or other means for establishing communications over the WAN, such as the Internet. A communications component, such as a modem, which can be internal or external, can be connected to the system bus 721 via the user input interface at input 740 and/or other appropriate mechanism. In a networked environment, program modules depicted relative to the computer 710, or portions thereof, can be stored in a remote memory storage device. It should be appreciated that the network connections shown and described are exemplary and other means of establishing a communications link between the computers can be used.

Figure 8:
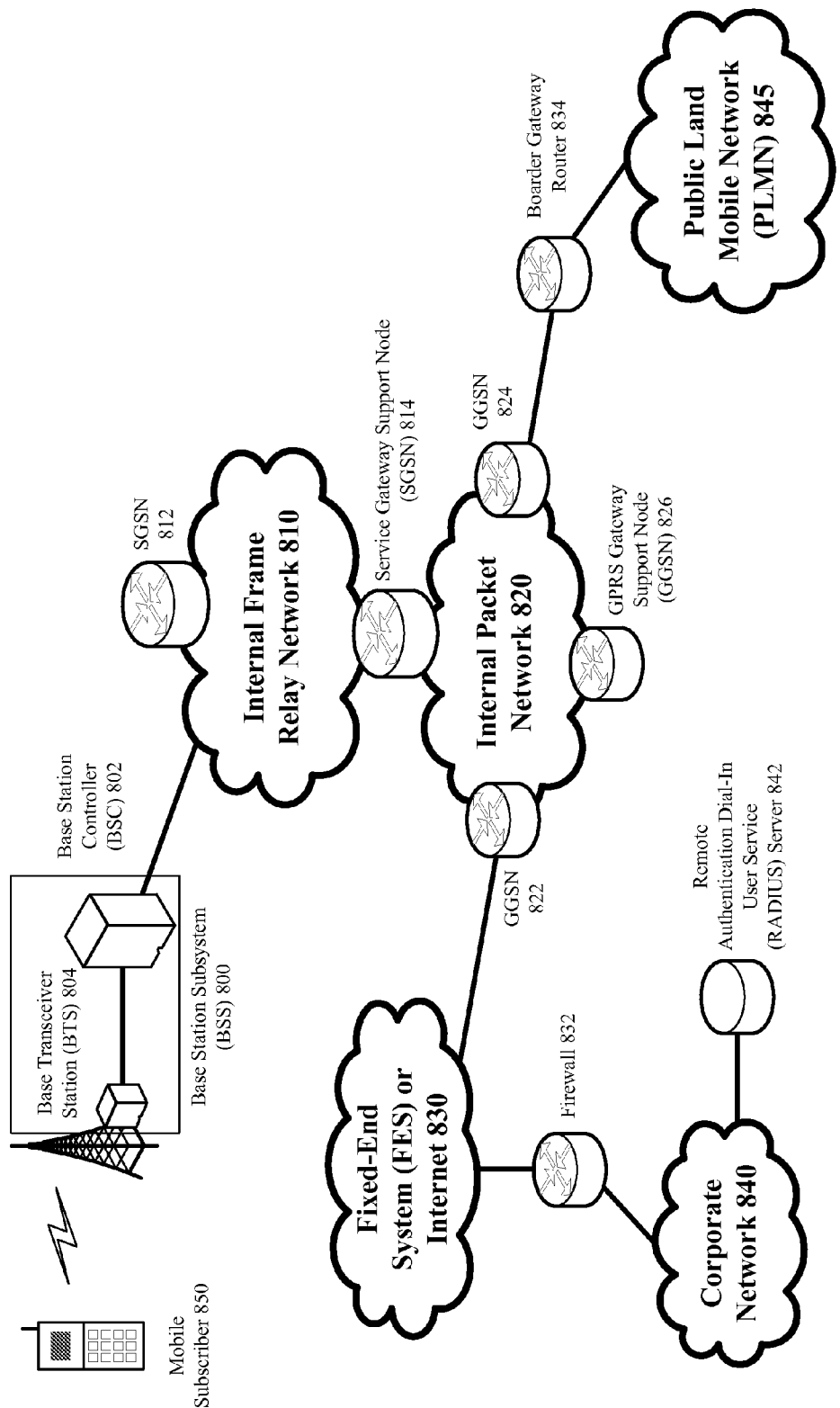
FIG. 8 illustrates an example wireless communication network in which various aspects described herein can be utilized.

Turning now to FIG. 8, an overview of a network environment in which the claimed subject matter can be implemented is illustrated. The above-described systems and methodologies for timing synchronization may be applied to any wireless communication network; however, the following description sets forth an exemplary, non-limiting operating environment for said systems and methodologies. The below-described operating environment should be considered non-exhaustive, and thus the below-described network architecture is merely an example of a network architecture into which the claimed subject matter can be incorporated. It is to be appreciated that the claimed subject matter can be incorporated into any now existing or future alternative architectures for communication networks as well.

FIG. 8 illustrates various aspects of the global system for mobile communication (GSM). GSM is one of the most widely utilized wireless access systems in today's fast growing communications systems. GSM provides circuit-switched data services to subscribers, such as mobile telephone or computer users. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications.

As one of ordinary skill in the art can appreciate, the exemplary GSM/GPRS environment and services described herein can also be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the timing synchronization techniques described herein may be applied independently of the method of data transport, and does not depend on any particular network architecture or underlying protocols.

FIG. 8 depicts an overall block diagram of an exemplary packet-based mobile cellular network environment, such as a GPRS network, in which the claimed subject matter can be practiced. Such an environment can include a plurality of Base Station Subsystems (BSS) 800 (only one is shown), each of which can comprise a Base Station Controller (BSC) 802 serving one or more Base Transceiver Stations (BTS) such as BTS 804. BTS 804 can serve as an access point where mobile subscriber devices 850 become connected to the wireless network. In establishing a connection between a mobile subscriber device 850 and a BTS 804, one or more timing synchronization techniques as described supra can be utilized.

In one example, packet traffic originating from mobile subscriber 850 is transported over the air interface to a BTS 804, and from the BTS 804 to the BSC 802. Base station subsystems, such as BSS 800, are a part of internal frame relay network 810 that can include Service GPRS Support Nodes ("SGSN") such as SGSN 812 and 814. Each SGSN is in turn connected to an internal packet network 820 through which a SGSN 812, 814, etc., can route data packets to and from a plurality of gateway GPRS support nodes (GGSN) 822, 824, 826, etc. As illustrated, SGSN 814 and GGSNs 822, 824, and 826 are part of internal packet network 820. Gateway GPRS serving nodes 822, 824 and 826 can provide an interface to external Internet Protocol ("IP") networks such as Public Land Mobile Network ("PLMN") 845, corporate intranets 840, or Fixed-End System ("FES") or the public Internet 830. As illustrated, subscriber corporate network 840 can be connected to GGSN 822 via firewall 832; and PLMN 845 can be connected to GGSN 824 via boarder gateway router 834. The Remote Authentication Dial-In User Service ("RADIUS") server 842 may also be used for caller authentication when a user of a mobile subscriber device 850 calls corporate network 840.

Generally, there can be four different cell sizes in a GSM network—macro, micro, pico, and umbrella cells. The coverage area of each cell is different in different environments. Macro cells can be regarded as cells where the base station antenna is installed in a mast or a building above average roof top level. Micro cells are cells whose antenna height is under average roof top level; they are typically used in urban areas. Pico cells are small cells having a diameter is a few dozen meters; they are mainly used indoors. On the other hand, umbrella cells are used to cover shadowed regions of smaller cells and fill in gaps in coverage between those cells.

The claimed subject matter has been described herein by way of examples. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Additionally, the disclosed subject matter can be implemented as a system, method, apparatus, or article of manufacture using standard programming and/or engineering techniques to produce software, firmware, hardware, or any combination thereof to control a computer or processor based device to implement aspects detailed herein. The terms "article of manufacture," "computer program product" or similar terms, where used herein, are intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, according to various permutations and combinations of the foregoing. Sub-components can also be implemented as components communicatively coupled to other components rather than included within parent components, e.g., according to a hierarchical arrangement. Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but generally known by those of skill in the art.

What is claimed is:

1. A method, comprising:
   determining, by at least one device, a channel matrix for a communication channel; and
   reducing a lattice basis for the channel matrix based on a reduction factor that varies exponentially with successive lattice reduction iterations to yield a reduced lattice basis for the channel matrix.

2. The method of claim 1, wherein the reducing includes controlling an extent to which the reduction factor is relaxed with the successive lattice reductions based on one or more adjustment parameters.

3. The method of claim 1, wherein the reducing includes relaxing the reduction factor based on at least one of an amount of processing time or a current working lattice dimension.

4. The method of claim 1, further comprising:
   identifying a lattice space-time code used for communication over the communication channel and a shaping region associated with the lattice space-time code;
   determining a transformed shaping region by applying the shaping region to the reduced lattice basis; and
   performing maximum likelihood decoding for the lattice space-time code based on the transformed shaping region.

5. The method of claim 1, further comprising performing signal detection for a receiver based on the reduced lattice basis.

6. The method of claim 1, wherein the reducing includes performing a Lenstra-Lenstra-Lovasz lattice reduction that uses the reduction factor.

7. An apparatus, comprising:
   a channel estimation component configured to determine a channel matrix corresponding to a communication channel; and
   a lattice reduction component configured to reduce a first lattice basis for the channel matrix to yield a second lattice basis for the channel matrix, wherein the lattice reduction component is configured to use a reduction factor that varies exponentially with successive lattice reduction iterations.

8. The apparatus of claim 7, wherein the lattice reduction component is further configured to vary the reduction factor according to a pre-defined parameter.

9. The apparatus of claim 7, wherein the lattice reduction component is further configured to vary the reduction factor as a function of processing time.

10. The apparatus of claim 7, wherein the lattice reduction component is further configured to vary the reduction factor as a function of a current working lattice dimension.

11. The apparatus of claim 7, further comprising a decoder associated with the channel estimation component, wherein the lattice reduction component is further configured to identify a lattice space-time code used for communication over the communication channel and a shaping region associated with the lattice space-time code.

12. The apparatus of claim 11, wherein the shaping region is at least one of spherical or ellipsoidal.

13. The apparatus of claim 11, wherein the decoder is further configured to:
   apply the shaping region to the second lattice basis to transform the shaping region; and
   perform maximum likelihood detection for a signal communicated using the lattice space-time code based on the shaping region.

14. The apparatus of claim 7, further comprising a signal detection component configured to perform signal detection for a receiver based on the second lattice basis.

15. The apparatus of claim 14, further comprising a decomposition component configured to separate the second lattice basis into an orthogonal component and a triangular component, wherein the signal detection component is further configured to perform the signal detection based on the orthogonal component and the triangular component.

16. The apparatus of claim 7, wherein the lattice reduction component is further configured to determined the second lattice basis via a Lenstra-Lenstra-Lovasz lattice reduction algorithm.

17. A computer-readable storage device having stored thereon computer executable instructions that, in response to execution, cause a computer system to perform operations, comprising:
   identifying a channel matrix corresponding to a communication channel; and
   performing lattice reduction for the channel matrix to obtain a lattice basis for the channel matrix, the lattice basis comprising vectors that are reduced relative to a previous lattice basis for the channel matrix, wherein the performing comprises performing the lattice reduction based on a reduction factor that varies exponentially with successive lattice reduction iterations.

18. The computer-readable storage device of claim 17, the wherein the performing the lattice reduction comprises relaxing the reduction factor exponentially as a function of an iteration of the successive lattice reduction iterations.

19. The computer-readable storage device of claim 17, wherein the operations further comprise:
   identifying a lattice space-time code used for communication over the communication channel; and
   identifying a shaping region associated with the lattice space-time code.

20. The computer-readable storage device of claim 19, wherein the identifying the shaping region comprises identifying at least one of a spherical shaping region or an ellipsoidal shaping region.

21. The computer-readable storage device of claim 19, wherein the operations further comprise:
   applying the shaping region to the lattice basis obtained for the channel matrix to yield a transformed shaping region; and
   performing maximum likelihood detection for a signal communicated using a lattice space-time code based on the transformed shaping region.

22. The computer-readable storage device of claim 17, wherein the operations further comprise:
   performing signal detection for a receiver based on the lattice basis obtained for the channel matrix.

23. The computer-readable storage device of claim 22, wherein the operations further comprise:
   separating the lattice basis into an orthogonal component and a triangular component, wherein the performing the signal detection comprises performing the signal detection based on the orthogonal component and the triangular component.

24. A system, comprising:
   means for identifying a channel matrix for a communication channel; and
   means for performing lattice reduction on a first lattice basis for the channel matrix to obtain a second lattice basis for the channel matrix that is reduced relative to the first lattice basis, wherein the lattice reduction is based on a reduction factor that varies exponentially with successive lattice reduction iterations.

* * * * *